United States Patent

Rhoton et al.

[15] 3,657,663

[45] Apr. 18, 1972

[54] AC THRESHOLD AMPLIFIER FOR USE IN FAILSAFE APPLICATIONS

[72] Inventors: Richard S. Rhoton, Pittsburgh; George M. Thorne-Booth, Murrysville, both of Pa.

[73] Assignee: Westinghouse Electric Corporation, Pittsburgh, Pa.

[22] Filed: May 27, 1970

[21] Appl. No.: 41,706

Related U.S. Application Data

[63] Continuation of Ser. No. 752,870, Aug. 15, 1968, Abandoned.

[52] U.S. Cl. .......... 330/165, 330/207 P

[51] Int. Cl. .......... H03f 1/00

[58] Field of Search .......... 307/202, 235; 329/192, 101; 330/165, 21, 207 P, 22, 170; 325/319, 474; 340/253

[56] References Cited

UNITED STATES PATENTS

| | | | |
|---|---|---|---|
| 1,903,846 | 4/1933 | Willoughby | 340/253 |
| 2,840,699 | 6/1958 | Carpenter, Jr. | 325/219 |
| 3,300,659 | 1/1967 | Watters | 307/202 X |
| 3,454,287 | 7/1969 | Gelernter | 307/235 |

FOREIGN PATENTS OR APPLICATIONS

| | | | |
|---|---|---|---|
| 191,777 | 1/1923 | Great Britain | 325/474 |

*Primary Examiner*—Nathan Kaufman

*Attorney*—F. H. Henson and R. G. Brodahl

[57] ABSTRACT

An AC amplifier having a built-in threshold has a circuit structure inherently providing a single predetermined output mode under any conditions of failure of its individual components or combinations thereof. The circuit employs the impedance transformation characteristics of unity gain amplifier stages coupled by step-up transformers to preamplify the signal. Another step-up transformer coupled the last gain stage to a transistor threshold circuit employing the forward conduction voltage of its base-emitter junction for the threshold action. The circuit is so arranged that its output mode under failure of components or combinations of components is the "absence of dynamic output."

4 Claims, 2 Drawing Figures

WITNESSES:
Bernard R. Gieguer
Michael F. Oglo

INVENTOR
Richard S. Rhoton
BY M.J. Bordahl
ATTORNEY

AC THRESHOLD AMPLIFIER FOR USE IN FAILSAFE APPLICATIONS

CROSS-REFERENCE TO RELATED APPLICATIONS

This is a continuation of application 752,870 filed Aug. 15, 1968 now abandoned.

SPECIAL DEFINITIONS

The term "vital function" as used herein, refers to one in which an incorrect mode of operation could have a catastrophic effect. An example of this would be in controlling train movements in an automated railway system.

The term "failsafe" denotes a characteristic by which apparatus for performing a vital function is made inherently immune to failure conditions which would cause a catastrophic effect. This is done by choosing the construction and components such that their failure will cause a predetermined "-safe failure mode," and adapting the apparatus to avoid catastrophic effects in the presence of this failure mode.

One approach in providing a safe failure mode is to adapt the apparatus to have presence of a dynamic signal as an indication of nonfailure, and to construct and arrange the apparatus to cause a safe failure mode in response to absence of the dynamic signal mode. Such a dynamic signal will sometimes hereinafter be referred to as a "dynamic failsafe signal."

BACKGROUND OF THE INVENTION

This invention relates to an AC amplifier having a built-in precision threshold. More particularly it relates to such a circuit of particular utility in certain failsafe applications.

The copending application of George M. Thorne-Booth titled "Signalling System For Determining The Presence Of A Train Vehicle," Ser. No. 662,711, filed Aug. 23, 1967, (W.E. 39,086) employs transmission of audio frequency (a.f.) signals in the running rails. Predetermined audio frequency carrier frequencies are assigned to each control block section of the track system. While the same assignment of the same carrier frequencies will not be applied to adjacent control blocks, they are repeated after regular intervals along the length of the track. Thus, a predetermined carrier frequency may be assigned to a first control block, and different frequencies assigned to the second and third successive control blocks, but the first carrier frequency again assigned to the fourth control block in succession. It has been proposed that an AC threshold amplifier be employed in the receivers for the a.f. signal. This would be done to reject any signals of like frequency which is intended for a remote control block. Such unauthorized signals would be weaker than those intended for the given signal block. In normal operation of the signaling system the a.f. signal is continuously applied to the signal block and absence of an a.f. signal at the input of a receiver indicates a train is present in the signal block. The scheme of control associated with the signaling system is adapted to cause a safe failure mode in response to absence of a dynamic signal at the output of the AC threshold amplifier. Accordingly for the AC threshold amplifier to itself be failsafe in this application it must have *no* dynamic output under any failure or combination of failures therein.

The input to the AC threshold amplifier will have a very wide dynamic range of signal amplitude. This is particularly true in the case of a train borne receiver. In that instance the receiver will sometimes pick up signals practically adjoining the point the signal is applied to the track where the signal amplitude may be as high as 1.0 volt rms. It will also pick up signals at the far end of the signal block where the signal amplitude is attenuated down to one millivolt region.

Accordingly, the objectives of the present invention include provision of:

1. A novel AC threshold amplifier circuit which is of a construction and arrangement providing absence of any dynamic output under any failure or combination of failure thereof.
2. A circuit in accordance with the preceding objective which provides accurate threshold levels in the millivolt region and providing failure of this threshold level only in the failsafe direction.
3. A circuit in accordance with the preceding objective which is capable of accepting a large dynamic range of input amplitudes extending from said millivolt level up to a level of the order of 1 volt.

SUMMARY OF THE INVENTION

Dual emitter followers provide power gain with a maximum voltage gain of +1. The output of the emitter followers drives a specially ruggedized transformer having a fixed voltage gain. The primary of the transformer is ruggedized such that it cannot short to the secondary or itself. Adequate impedance mismatches are provided by this arrangement so that gain of the amplifier is not reduced because of component tolerances. Two or more stages of this type may be provided. The phasing of the coupling transformers are chosen such that distortions present in the circuit are not unidirectional. From this amplification arrangement the signal is passed to a transistor threshold circuit which depends upon the forward conduction voltage of the base to emitter junction to provide the threshold action. The entire circuit structure is arranged such that any failure or combination of failures can only lower the output voltage or increase the threshold.

DETAILED DESCRIPTION OF PREFERRED EMBODIMENT

Figure 1:
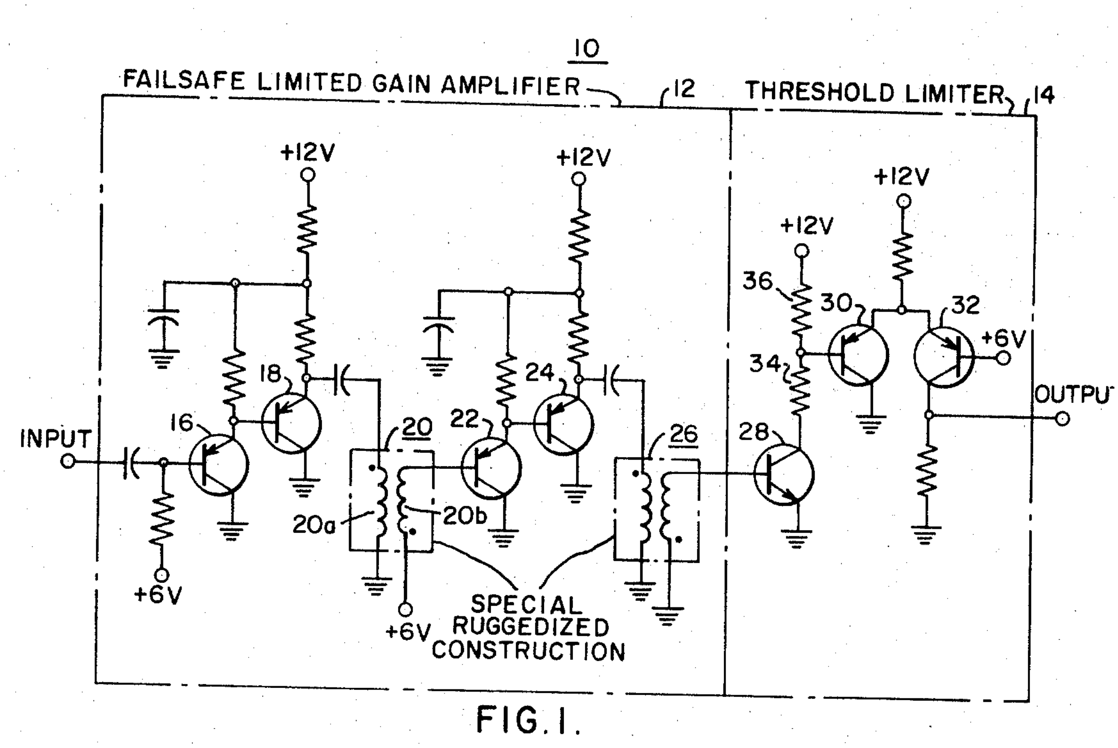
FIG. 1 is an electrical schematic of an AC amplifier having a built-in threshold in accordance with the present invention.
Figure 2:
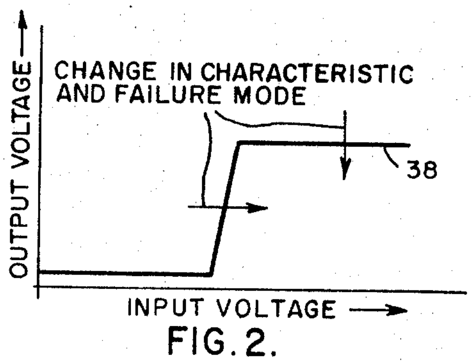
FIG. 2 is a curve of output characteristics of the electric circuit of FIG. 1 and the sense of changes in these characteristics under failure conditions have been indicated thereon.

Referring now to the drawing and in particular to FIG. 1, the AC amplifier 10 having built-in threshold is broadly composed of a failsafe limited gain amplifier 12 and a threshold limiter 14.

The limited gain amplifier 12 is used to increase the signal level to a suitable level where it can be reliably and accurately thresholded. An input signal is first subjected to the impedance lowering level effects of Darlington connected emitter follower stages 16 and 18. As is well known in the art, this provides unity gain in voltage which cannot go larger than plus 1 under any possible failure condition. It also provides impedance transformation from the input side of the Darlington connected stage which have an impedance in this case of 160,000 ohms or greater to the output side which has an impedance of 50 ohms or less. From the output side of the Darlington connected stages the signal is passed to a step-up transformer 20 having a primary winding **20*a* and a secondary winding 20*b*. This provides a predetermined voltage gain as determined by the turns ratio of the transformer. In a typical application a turns ratio of 1:6 is used. As denoted by legend in the drawing, transformer 20 is of a "special ruggedized construction" to restrict occurrence of any non-failsafe mode of failure until after a failsafe component of the circuit would otherwise fail under the same stimuli. What is meant by this will be described in greater detail later herein. The secondary of the transformer 20 is coupled to another pair of Darlington connected transistor emitter follower stages 22 and 24. While the embodiment depicted in the drawing shows only this second stage of amplification, any number may be provided in order to obtain the desired amplification in amplifier 12. If more than two were used the succeeding stages would be coupled by step-up transformers in the same manner. One limit to the number of stages of amplification would of course be avoidance of stray feedback which could cause oscillation. Another specially ruggedized construction of step-up transformer 26 couples the signal to the threshold limiter 14**.

Threshold limiter 14 comprises a transistor 28. It conventionally operates as a threshold device using the forward conduction voltage of the base-emitter junction as its thresholding mechanism. The collector signal is coupled to a conventional differential amplifier consisting of transistors 30 and 32. Coupling to the differential amplifier is through a resistive voltage divider, consisting of resistors 34 and 36 which connect to the power source. The values of resistors 34 and 36 are so chosen that short circuiting of transistor 28 would result in the application of a negative acting turn on bias to the base of transistor 30 which would prevent any dynamic output from the circuit. As previously noted absence of a dynamic output from the circuit is its predefined failsafe failure mode.

Note that step-up transformers 20 and 26 are each so wound that they perform a phase polarity inversion. Because of the very large dynamic range of input amplitudes which the circuit must accept, the signal could incur distortion in passing through the transistors which are not perfectly linear devices. Reversing the phase of signal at the transformer between stages ensures that the distortion (any) will tend to be bidirectional, providing a more symmetrical signal to the threshold circuit.

As hereinabove noted, transformers 20 and 26 have been ruggedized for restriction of their non-failsafe modes of failure. These are the modes which would give a gain increase and thereby in effect lower the threshold level. Basically this can happen in two ways: (a) the primary shorting to the secondary; or (b) shorting out of one or more primary windings so that the step-up ratio is increased. One way of restricting occurrence of these modes of failure is by physically separating each turn of the windings (particularly the primary winding) and physically separating winding from the secondary winding, and potting the whole in epoxy as an integral construction. One would literally have to take a hammer to this construction to cause shorting of any of the windings. Obviously the transistors of other stages of circuit 10 would cease to operate upon application of such mechanical stimuli, and this would result in the condition of no output of circuit 10. Similarly, the amount of heat which would have to be applied to cause shorting of the windings with such construction would cause the transistor stages to cease to operate. The ruggedizing effects would also be achieved by use of known techniques and materials for application of high mechanical and temperature resistant insulation to a wire.

An important feature of the invention is the combination of the unity gain active stages with the passive voltage gain stages. This provides a circuit structure for amplification which is compatible with the failsafe requirement of no output from the threshold stage. Also, in accordance with well known principles the large degree of impedance mismatch between the emitter followers and the transformers provide extremely stable gain characteristics. The use of a base-emitter junction threshold circuit provides the advantage of low power requirements, and also permits the described arrangements such that any failure prevents a dynamic output. Low power requirements are of course very important in train applications. The approach of alternate unity gain amplifiers and step-up transformers in the prethresholding amplification stage is uniquely compatible with the base-emitter threshold circuit. The use of step-up transformer 26 allows convenient coupling between the two and inherently provides the previously described advantages of high stability and safe failure mode. The input-output characteristics of circuit 10 are shown as curve 38, FIG. 3. From the preceding description it will be apparent that any failure or combination of failures can only move this output curve to the right or to zero, as indicated in the drawing. This is the inherent failsafe characteristic of circuits 10.

Also, circuit 10 has been found to have a very large dynamic range. By choice of a proper number of gain stages a dynamic range extending from the millivolt region to signals of the order of 1 volt can be achieved.

The coupling between unity gain amplifying stages and from the last amplification stage to the threshold stage has been illustrated by a step-up transformer. However, it should be understood that any passive impedance transformation network could be employed just as well, providing it gives the failsafe mode of operation. For example, a capacitive impedance transformation network could be used.

While a preferred embodiment of the invention has been described, it should be understood that various modifications and changes in the arrangement of parts may be made within the scope and spirit of the present invention.

What is claimed is:

1. A threshold AC amplifier circuit operative to pass a signal within a range of input signal amplitudes extending down to approximately 1 millivolt, comprising;

first and second current amplifier means, each having a maximum voltage gain of unity, threshold circuit means having a predetermined voltage threshold for passing a signal only if said signal exceeds said threshold, said first and second current amplifiers being coupled to one another by a step-up transformer, said second current amplifier being coupled to the input of the threshold circuit means by another step-up transformer.

2. The circuit in accordance with claim 1, with said current amplifiers each comprising a Darlington connected transistor stage, said threshold circuit means comprising the emitter to base path of a transistor.

3. The circuit in accordance with claim 2, with said step-up transformer coupling the first and second Darlington connected amplifier stages to one another being poled to reverse the phase of a signal in coupling same.

4. A threshold amplifier circuit which passes signals within a given amplitude range comprising, in combination:

a unity gain amplifier, having an input to which an input signal is applied, and an output at which an output signal is provided in response to said input signal;

a threshold circuit having an input, and an output which provides a signal only in response to a signal of at least a selected level being applied to said input; and a step-up transformer connected between the output of said unity gain amplifier and the input of said threshold circuit.

* * * * *